(12) United States Patent
Wala et al.

(10) Patent No.: US 12,341,672 B2
(45) Date of Patent: Jun. 24, 2025

(54) LOGGING CONFIGURATION SYSTEM AND METHOD

(71) Applicant: Sophos Limited, Abingdon (GB)

(72) Inventors: Avni Bhupendrakumar Wala, Bangalore (IN); Yogesh Kumar Bansal, Bangalore (IN); Bhaskar Sen, Delhi (IN); Sowri Raju Bathineni, Bengaluru (IN); Sumit Jindal, Zirapkpur (IN)

(73) Assignee: Sophos Limited (GB)

( * ) Notice: Subject to any disclaimer, the term of this patent is extended or adjusted under 35 U.S.C. 154(b) by 380 days.

(21) Appl. No.: 18/083,488

(22) Filed: Dec. 17, 2022

(65) Prior Publication Data
US 2024/0154981 A1    May 9, 2024

(30) Foreign Application Priority Data
Nov. 4, 2022   (IN) .............................. 202211063050

(51) Int. Cl.
| | |
|---|---|
| *H04L 43/08* | (2022.01) |
| *H04L 9/40* | (2022.01) |
| *H04L 41/06* | (2022.01) |
| *H04L 43/04* | (2022.01) |

(52) U.S. Cl.
CPC .............. *H04L 43/08* (2013.01); *H04L 41/06* (2013.01); *H04L 43/04* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 12,003,546 | B1* | 6/2024 | Quiros | ................ H04L 63/1425 |
| 2011/0055371 | A1* | 3/2011 | Serban | ................ H04L 63/1425 |
| | | | | 709/224 |
| 2024/0106710 | A1* | 3/2024 | Lian | .................... H04L 67/1396 |
| 2024/0146602 | A1* | 5/2024 | Smaalders | ............ H04L 41/069 |
| 2024/0179168 | A1* | 5/2024 | Manthiramoorthy | ........................ |
| | | | | H04L 63/1425 |

OTHER PUBLICATIONS

Wikipedia Contributors. (Oct. 6, 2022). Syslog:Security Level. https://en.wikipediaorg/wiki/Syslog.

* cited by examiner

Primary Examiner — Jeffrey R Swearingen
(74) Attorney, Agent, or Firm — Danielson Legal LLC

(57) ABSTRACT

Systems and methods for monitoring network activity. The methods include receiving at an interface a first logging parameter for a first network device, wherein the first logging parameter specifies how the first network device is to record data associated with the first network device; communicating the first logging parameter to the first network device; and indicating to the first network device a first network-accessible location to where the first network device is to transmit its recorded data, wherein the first network device is configured to record data in accord with the first logging parameter and transmit the recorded data to the first network-accessible location.

20 Claims, 8 Drawing Sheets

```
{
    "log_module_conf": [
        {
            "module_name": "MODULE_1:COMPONENT_1",
            "log_level": 7
        },
        {
            "module_name": "MODULE_2:COMPONENT_2",
            "log_level": 3
        },
    ],
    "default_log_level": 4
}
```

LOGGING CONFIGURATION SYSTEM AND METHOD

CROSS-REFERENCE RELATED TO APPLICATION

The present application is the domestic filing of and claims the benefit of co-pending Indian Patent Application No. 20221163050, filed in India on Nov. 4, 2022.

TECHNICAL FIELD

The present application relates generally to systems and methods for monitoring network activity and, more particularly but not exclusively, to systems and methods for configuring network devices to log network activity.

BACKGROUND

Logs are a primary source of support to analyze issues or activity occurring at devices or appliances on a network. Logs may include data regarding communications being sent to a device, communications being sent by a device, or some combination thereof. These devices may include, routers, firewalls, other types of access points, or the like.

Oftentimes security personnel, network administrators, or the like may rely on logs to analyze network activity. For example, security personnel may analyze logs to identify malicious activity or to otherwise identify an issue or the cause of an issue.

Accessing or otherwise obtaining the correct logs may pose a challenge for security personnel, as security personnel may not have direct access to customer devices. Collecting the correct logs can therefore be difficult. Collecting logs is typically a manual process and may require multiple iterations before the correct log(s) are made available to security personnel. For example, there is no guarantee that a user associated with the device may select and transmit the correct log to the security personnel for analysis.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for monitoring network activity. In some embodiments, an interface may allow a user to specify one or more logging parameters for at least a first network device. The first logging parameter may specify how the first network device is to record data associated with the first network device. The embodiments herein may communicate the first logging parameter to a configuration service, which generates a configuration file including a network-accessible location where the first network device is to transmit its collected data. The configuration service may communicate the configuration file to the first network device, which may then convert the configuration file to a second logging parameter, collect data in accord with the second logging parameter, and transmit the collected data to the network-accessible location.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
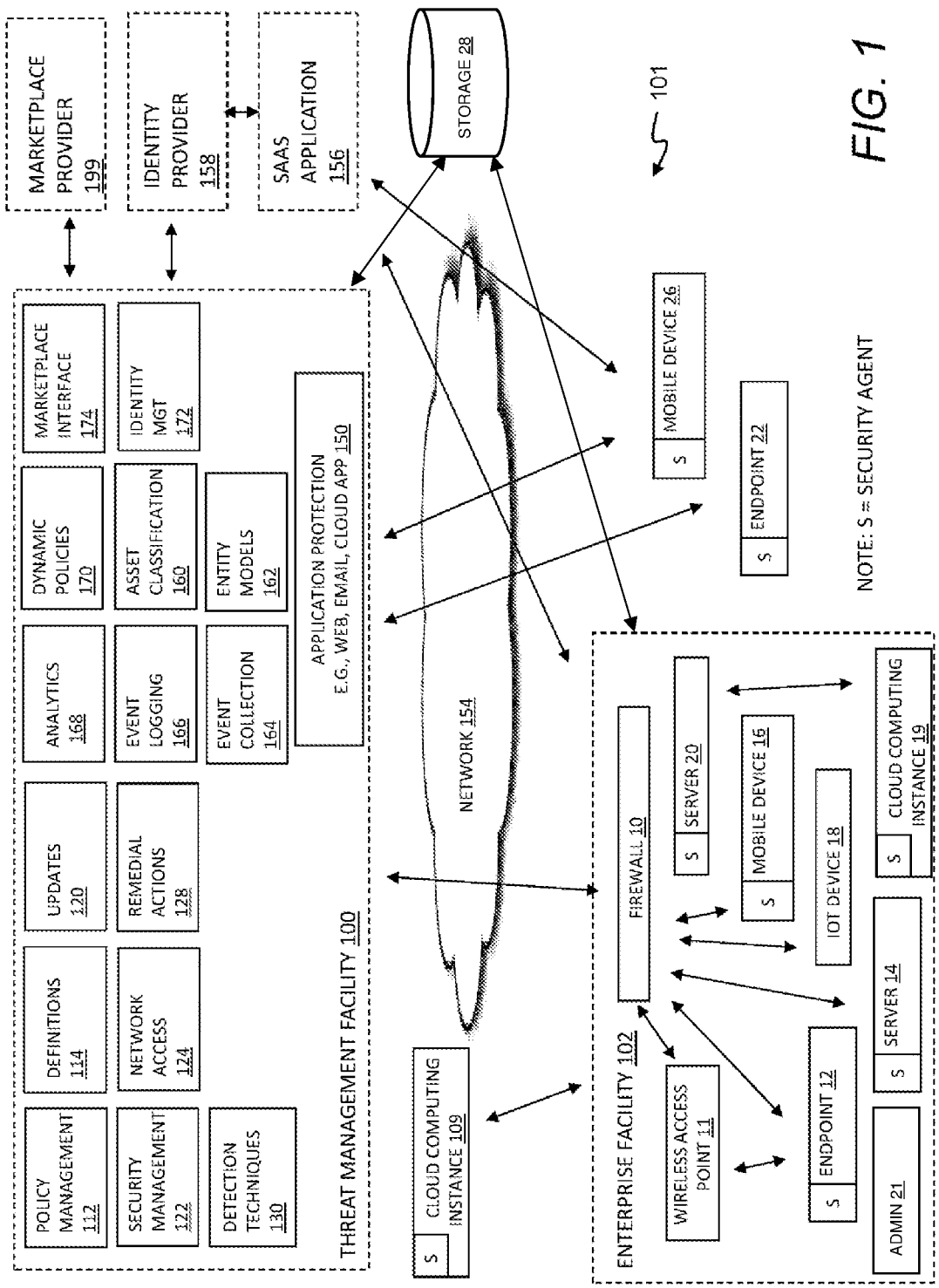
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Configuring network devices to gather logs may be difficult for network administrators, security personnel, or other interested parties. For example, a network administrator or an entity otherwise tasked with monitoring activity on a network may want to receive and review logs associated with devices on the network. These logs may help administrators review network activity to, for example, gather data regarding devices on the network or to identify malicious or potentially malicious activity.

Administrators typically provide a device with instructions regarding how to gather network activity data while initially configuring the device. If an administrator wants to later change how the device gathers data, they would likely have to modify the firmware associated with the device. This can be a time-consuming and resource-intensive process, and may also require the device to be non-operational for a period of time.

Additionally, collecting logs from network devices can be difficult for entities that do not have direct access to the device(s). For example, an entity such as security personnel or a product support specialist may need to request access to a device's logs. A network administrator may then need to gather and send the logs to the security personnel. This may require multiple iterations, as there is no guarantee the security personnel requests the correct logs, the network administrator sends logs from the correct software module of the device, sends the logs from the correct time(s), or otherwise sends the most useful logs.

The embodiments herein provide novel systems and methods for monitoring network activity that overcome the above disadvantages of existing logging techniques. The disclosed embodiments enable a network administrator or other interested party to provide via a cloud-accessible interface one or more logging parameters for one or more network devices. The logging parameter(s) may specify how a network device is to collect data associated with its operation.

The embodiments herein may communicate the logging parameter(s) to the network device. The communication may also indicate a network-accessible location where the network device may transmit its collected data.

The network-accessible location may store the received collected data for later retrieval by an administrator or security personnel for analysis. For example, network administrators or security personnel may subsequently inspect the logs to identify bugs, malicious activity, potentially-malicious activity, or to gather other types of metrics.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint or otherwise a network device 12, a server 14, a mobile device 16, an appliance or Internet-of-Things (IOT) device 18, a cloud computing instance 19, a server 20, and an administrator device 21. Again, the compute instances 10-21 depicted are by way of example, and there may be any number or types of compute instances 10-21 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an network 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility 168. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

In addition to detecting threats, various components, services, or facilities shown in FIG. 1 may provide the logging configuration features in accordance with the embodiments herein. For example, the administrator device 21 may allow an administrator to provide one or more logging parameters for one or more network devices such as firewall 10, endpoint 12, IOT device 18, endpoint 22, etc. The network device(s) may then collect data in accord with the provided logging parameter(s), and transmit the collected data to a network-accessible location such as the storage 28. The administrator device 21, the analytics facility 168, or some combination thereof may subsequently access the collected data from the storage 28 for analysis.

Figure 2:
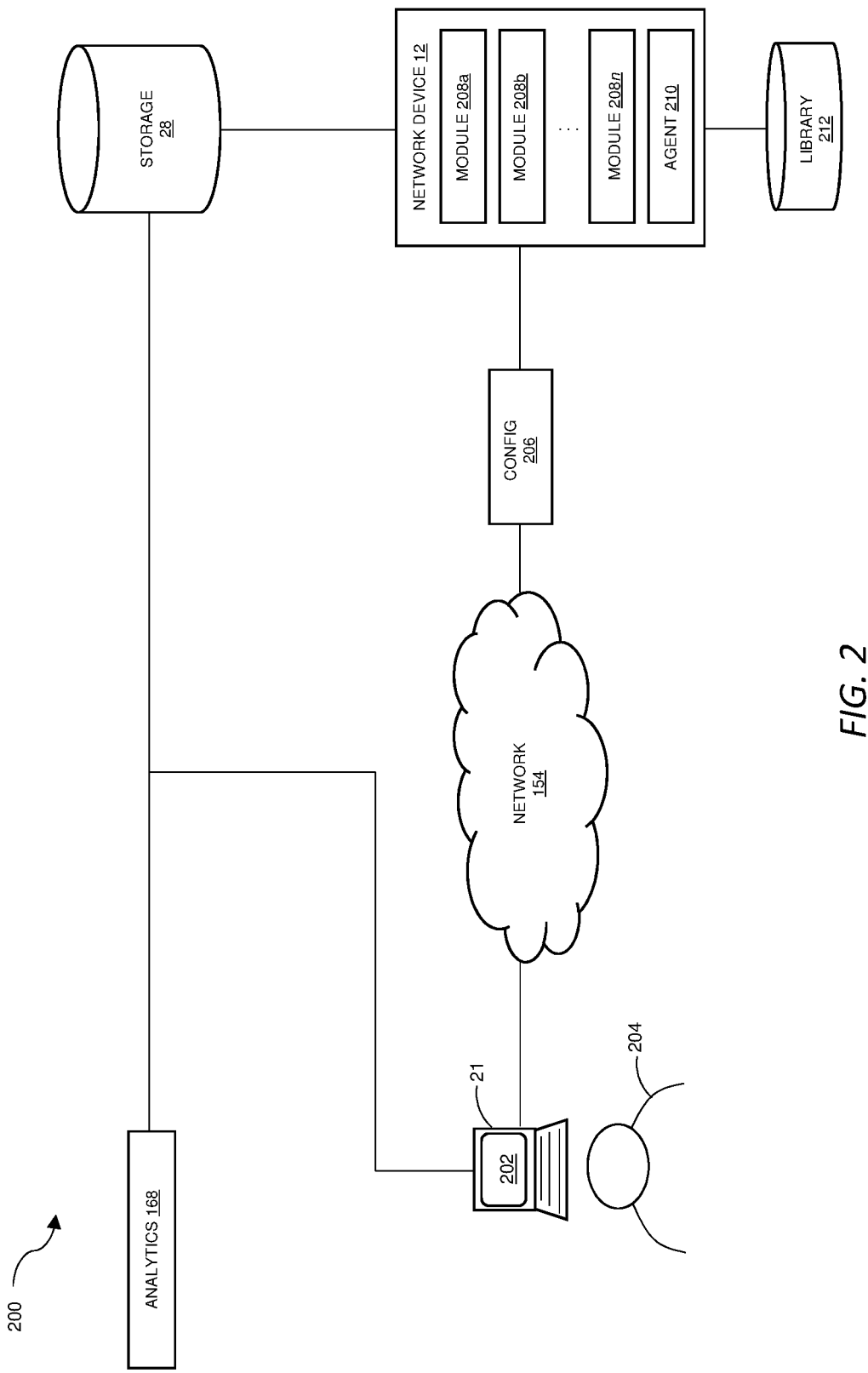
FIG. 2 illustrates a system for monitoring network activity in accordance with one embodiment.

FIG. 2 illustrates a system 200 for monitoring network activity in accordance with one embodiment. Specifically, FIG. 2 illustrates the administrator device 21 of FIG. 1 providing a logging parameter to a network device 12 in accordance with one embodiment. The administrator device 21 may include or otherwise execute a user interface 202 accessible by a user 204. In this embodiment, the user 204 may be a network administrator tasked with monitoring a network such as a private, corporate network.

The administrator device 21 may be configured as a laptop, personal computer (PC), tablet, smartphone, or any other type of input/output ("I/O") device. The exact type of administrator device 21 may vary as long as the user 204 can provide the desired logging parameters.

The user interface 202 may present to the user 204 a control panel that enables the user 204 to provide the desired logging parameter(s). For example, as seen in FIG. 2, the user device 21 is in connectivity with a configuration service 206 or microservice (not shown in FIG. 1) and a network device 12 over one or more networks 154. In this embodiment, the user 204 may want to configure or update the endpoint (for simplicity, "network device 12") to record data associated with its operation.

The network(s) 154 may link the various components with various types of network connections. The network(s) 154 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 154 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The user interface 202 may run on or otherwise accessible through cloud-based network 154, and may first allow or require the user 204 to provide authentication credentials. For example, the user 204 may need to provide credentials to prove they are authorized to configure the network device(s) 12. Once authenticated, the user 204 may provide via the user interface 202 one or more logging parameters for the network device 12.

In the context of the present application, a "log" may refer to this data recorded or otherwise collected by a network device. The embodiments herein may or may not perform processing steps on the collected data before the network device 12 transmits the collected data to the network-accessible location.

The network device 12 may be an on-premise device configured as hardware or software infrastructure that are hosted on-site, such as at or part of the enterprise facility 102. The network device 12 may include or otherwise execute a plurality of software modules including software module 208a, 208b, . . . , 208n, where n is the number of software modules the network device 12 executes. The network device 12 may also include or otherwise execute an agent 210 to convert received configuration files into actionable instructions to implement the logging parameter(s) to record data in accord thereof. For example, the agent 210 may contact a log-management library 212 for instructions regarding interpreting or converting a received configuration file into actionable instructions to obtain the desired functionality of the provided logging parameter(s).

The software modules 208a-n may be implemented in one or more computer-programming and/or scripting languages. These may include, but are not limited to, C, C++, Java, Python, Perl, Javascript, or the like.

Each software module 208a-n may, if instructed by the agent 210, gather logs regarding its operation. For example, there may be a log record for each file and one for each logging level of the Syslog protocol. The network device 12 may then communicate the collected data (i.e., gathered logs) to one or more network-accessible locations such as storage 28. The storage 28 may store the received data, and may also allow access thereto by the administrator 21 and the analytics facility 168.

Figure 3:
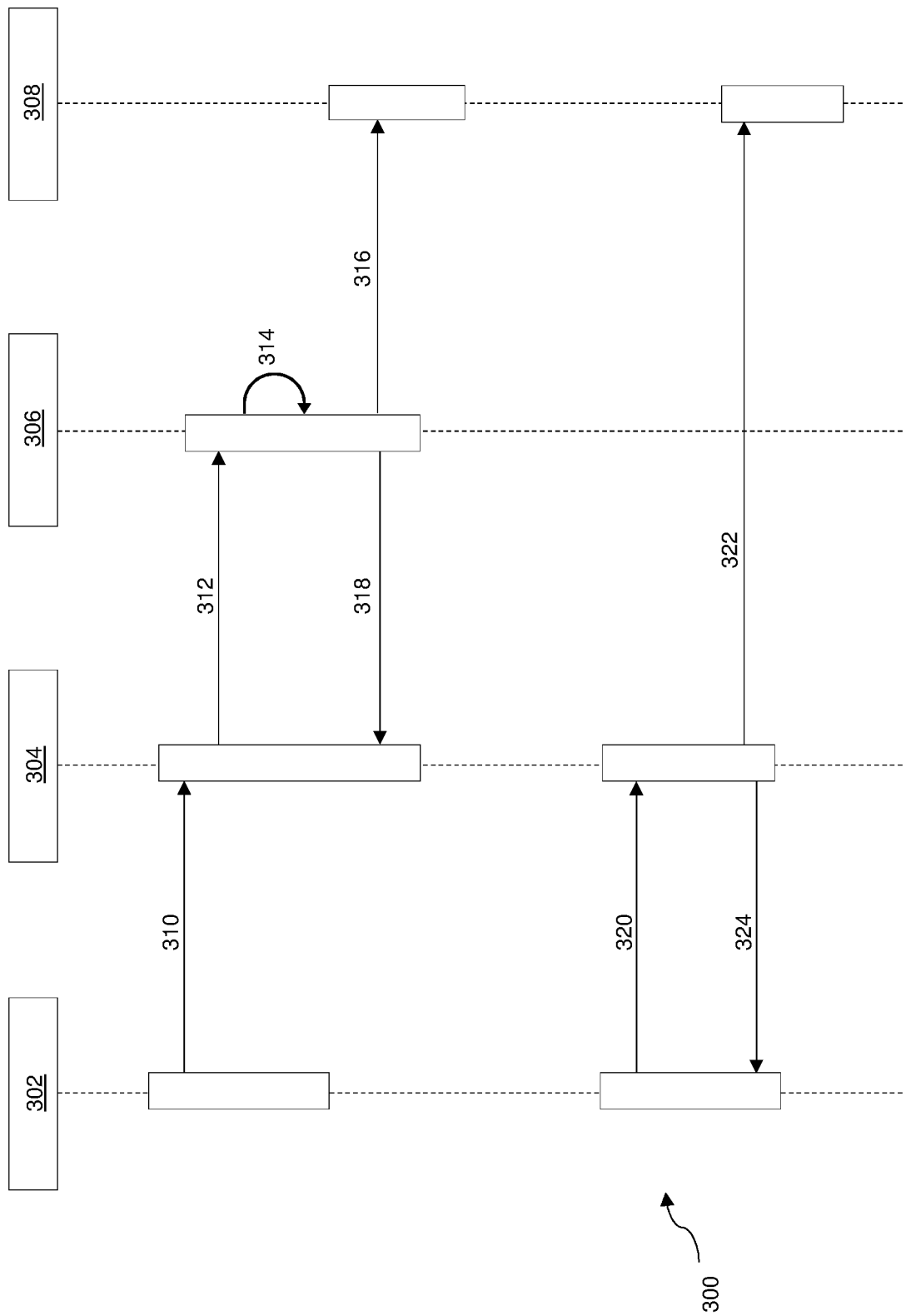
FIG. 3 presents a workflow diagram for monitoring network activity in accordance with one embodiment.

FIG. 3 illustrates a workflow diagram 300 for monitoring network activity in accordance with one embodiment. The workflow diagram 300 involves a user interface 302, a configuration service 304, a network device 306, and a network-accessible storage location 308. One or more of the devices, systems, and/or components illustrated in FIGS. 1-2 may implement the workflow diagram 300, and is discussed by way of reference thereto. For example, the user interface 302 may be similar to the user interface 202 of FIG. 2, the configuration service 304 may be similar to the configuration service 206, the network device 306 may be similar to the network device 12, and the network-accessible storage location 308 may be similar to the storage 28.

In step 310, the user interface 302 may communicate one or more logging parameters to the configuration service 304. For example, a user may provide one or more logging parameters for one or more network devices 306. In some embodiments, a logging parameter may include a device enable or device disable option. This option allows a user to enable or disable logging for a particular network device 306.

In some embodiments, a logging parameter may include an option to enable or disable one or more software modules associated with the network device 306. This option allows a user to enable or disable logging for a particular software module.

In some embodiments, a logging parameter may relate to logging level. This option allows a user to specify or request logs for particular severity levels of the Syslog standard (e.g., Emergency, Alert, Critical, Error, Warning, Notice, Informational, and Debug).

In some embodiments, a logging parameter may relate to the temporal frequency at which logs are collected. For example, a user may specify that a software module may output a log once every minute. In some embodiments a user may configure a network device 306 or software module thereof to record data and transmit recorded data on demand.

In some embodiments, a logging parameter may relate to a logging threshold for one or more software modules of the network device 306. Oftentimes a software module may generate a prohibitively high number of log entries such that the logs burden administrators and consume computational resources while providing little value for administrators. Accordingly, a user may specify a threshold such that, if a particular software module generates logs in excess of the specified threshold, an agent such as agent 210 may automatically suppress logs from that particular software module. The agent may suppress logs momentarily or permanently, for example.

In some embodiments, a logging parameter may specify what log files to collect. For example, a user may specify files from particular software modules. As discussed above, a user may also specify which software level(s) collect and transmit data.

In some embodiments, a logging parameter may specify which system parameters to collect and at what interval. For example, the user may instruct the network device 306 to record data regarding its central processing unit (CPU) and memory data every thirty seconds.

The above logging parameters are presented by way of example only. Other types of logging parameters, whether available now or developed hereafter, may be specified in addition to or in lieu of those described above. Similarly, a user may provide only one logging parameter or multiple logging parameters.

Once or after the user provides the desired logging parameters, the interface 302 may trigger a "collect logs" instruction for the network device 306, or an agent executing on the network device 306, that is sent to a configuration service 304. The configuration service 304 may receive the provided logging parameter(s) and generate a configuration file such as a Changelog for receipt by the network device 306.

Figure 4:
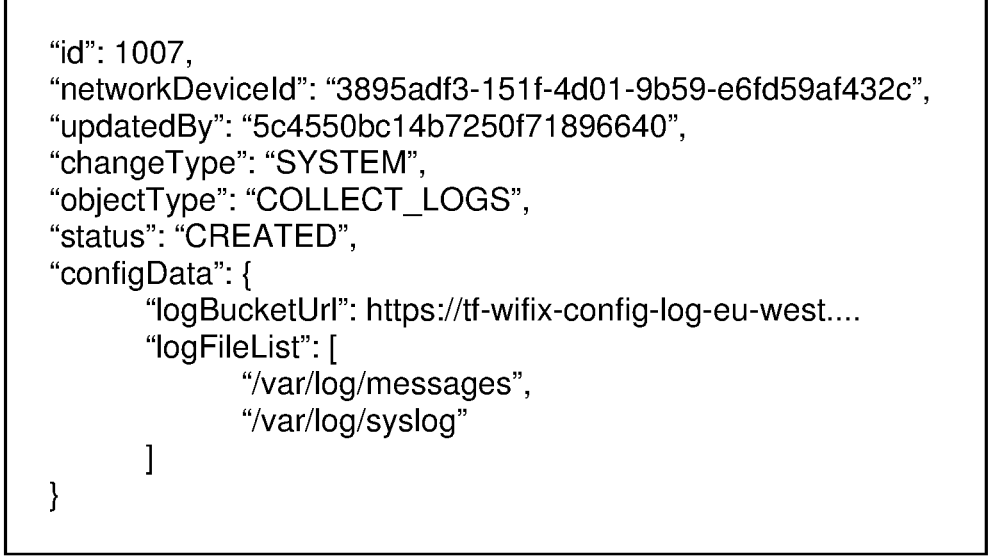
FIG. 4 presents a configuration file in accordance with one embodiment.

FIG. 4 presents an example of a configuration file 400 such as a Changelog in accordance with one embodiment. As seen in FIG. 4, the Changelog may 400 may include several different types of fields and associated values related to logging parameters. For example, the "id" field is a unique value associated with a change; networkDeviceId, an identifier of the network device to which the logging parameter is to be applied; changeType, the type of change; objectType, the designated action (e.g., collect logs, reboot device, etc.).

The value associated with the "logBucketUrl" field may indicate the network accessible location to which the network device should transmit its collected data. For example, this value may indicate a particular server or bucket to receive the collected data. The "logFilesList" may specify which files the network device 306 should transmit to the network-accessible storage location 308.

The user may provide the network-accessible location when providing the logging parameter. For example, the user may designate a particular network-accessible storage location to which the network device is to transmit its collected data. Or, in some embodiments, the configuration service 304 may select the network-accessible location by a random or pseudo-random algorithm. The embodiments herein may also select a particular network-accessible location based on an amount of storage space available on the network-accessible location.

The network device 306 may in step 314 compress the requested files, and then in step 316 upload or otherwise transmit the compressed files to the network-accessible storage location 308. That is, the network device 306 may transmit the collected data to the location indicated in the configuration file 400. The network device 306 may also indicate to the configuration service 304 in step 318 that the network device has received and processed the configuration file 400. For example, in some embodiments, the network device 306 may need to convert the configuration file 400 into a second logging parameter that is understandable and actionable by the network device 306.

The user or other interested party such as a product support specialist or security personnel may later want to view the collected data. Accordingly, in step 320 the user interface 302 may receive and communicate to the configuration service 304 a request to obtain the collected data. In step 322 the configuration service 304 may issue a "GET" request to the network-accessible storage location 308 to obtain the requested logs. Although FIG. 3 illustrates the user interface 302 (i.e., the component that initially provided the logging parameter) requesting the logs from the network-accessible location 308, other authorized entities such as security personnel, support specialists, service providers, etc., may similarly request the stored logs using another, similar user interface 302'. The configuration service 304 may then in step 324 provide the requested logs to the interface 302.

Figure 5:
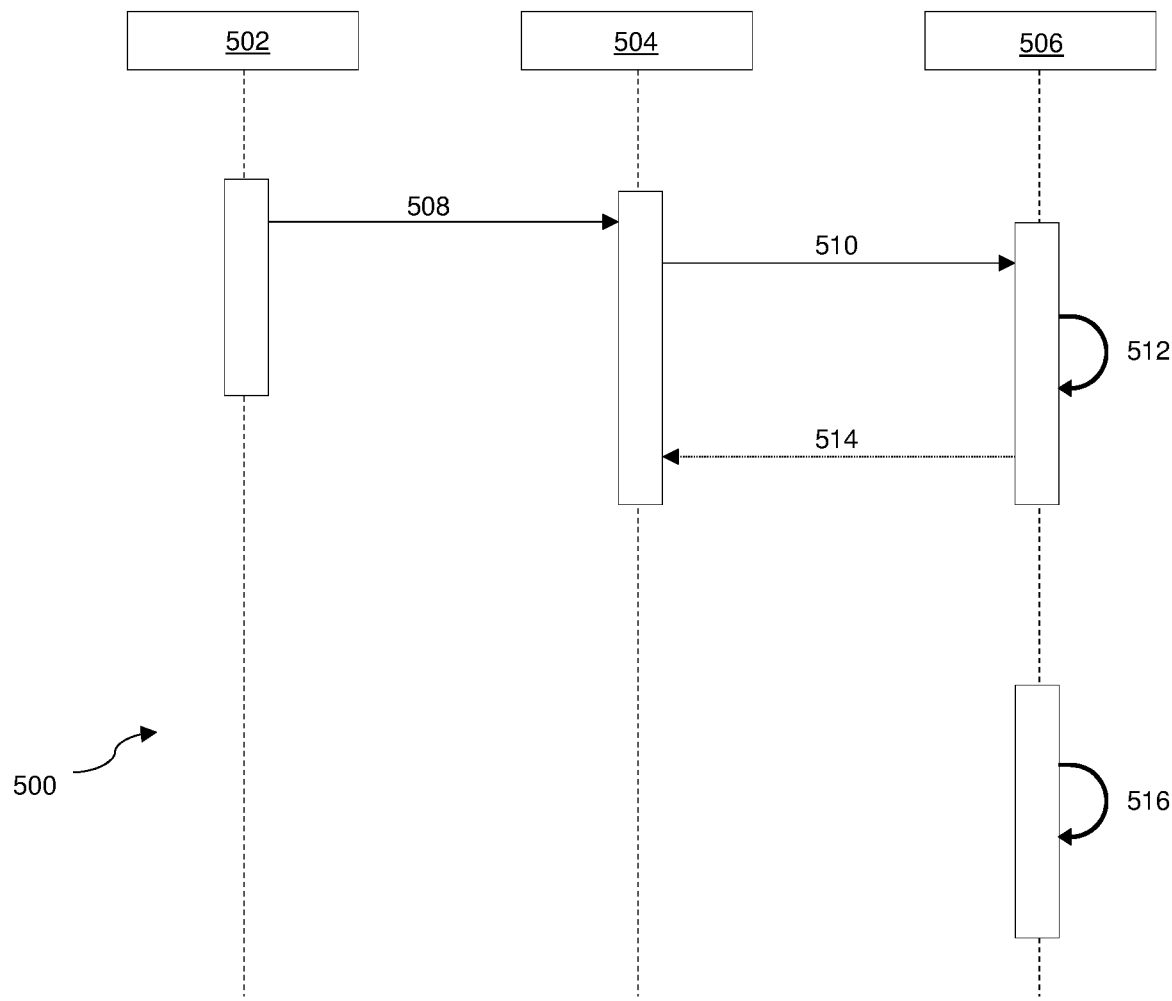
FIG. 5 presents a workflow diagram for monitoring network activity in accordance with another embodiment.

FIG. 5 illustrates a workflow diagram 500 in accordance with another embodiment. The workflow diagram 500 illustrates a logging parameter adjustment process in accordance with one embodiment, and involves an interface 502, a configuration service 504, and a network device 506. Specifically, the diagram 500 illustrates a process in which a user may change the logging level of a module of the network device 506. One or more of the devices, systems, or components illustrated in FIGS. 1-2 may implement the workflow diagram 500, and is discussed by way of reference thereto. For example, the interface 502 may be similar to the interface 302 of FIG. 3, the configuration service 504 may be similar to the configuration service 304, and the network device 506 may be similar to the network device 306.

Step 508 involves the user interface 502 receiving and communicating a request to the configuration service 504 to change the logging level of a software module. The configuration service 504 may generate an appropriate configuration file representative of the desired logging parameter(s) or adjustment thereto.

Figures 6, 7:
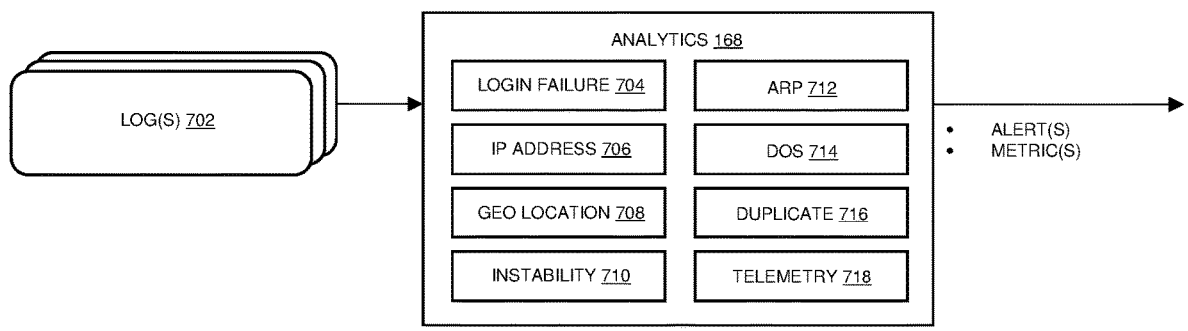
FIG. 6 presents a configuration file in accordance with another embodiment.
FIG. 7 illustrates the analytics module of FIGS. 1 & 2 in accordance with one embodiment.

For example, FIG. 6 presents a configuration file 600 in accordance with another embodiment. The configuration file 600 relates specifically to two modules executing on one or more network device 506—a. Each of these modules is assigned a desired log level. For example, MODULE_1: COMPONENT_1 is assigned log level setting 7 and MODULE_2:COMPONENT_2 is assigned log level setting 3. These log level numerals may correspond to different levels of the Syslog standard (i.e., log level 3 is Error, log level 7 is Debug, etc.).

The configuration file 600 also indicates a default logging level. For example, modules not specified in the configuration file 600 are assigned log level setting 4.

Referring back to FIG. 5, step 510 involves communicating the configuration file to the network device 506. The network device 506, or an agent executing thereon, may then in step 512 convert the configuration file to a second logging parameter actionable by the network device 506 to change the logging levels of the appropriate software modules. The network device 506 may compress the collected data and indicate in step 514 to the configuration service 504 that the configuration file has been received. The network device 506 may then record data in accord with the adjusted logging parameters. Although not shown in FIG. 5, the network device 506 may transmit the collected data to a network-accessible location.

Referring back to FIG. 2, the analytics facility 168 may analyze the collected data for debugging purposes as well as for other analytics purposes. For example, the analytics facility 168 may analyze collected data to help identify various issues and their causes. The analytics facility 168 may be associated with the user that submitted the logging parameter(s). Additionally and/or alternatively, the analytics facility 168 may be associated with another entity such as security personnel, a service provider, or the like.

FIG. 7 illustrates the analytics facility 168 of FIGS. 1 & 2 in accordance with one embodiment. As seen in FIG. 7, the analytics facility 168 may execute one or more of a plurality of modules to analyze certain features of one or more logs 702. For example, in some embodiments, a login failure submodule 704 may detect and analyze instances of multiple login failures. Multiple login failures may indicate an unscrupulous or otherwise unauthorized entity is attempting to gain access to a network device, such as through a brute force process or by guessing a legitimate user's password.

In some embodiments, an IP address submodule 706 may detect instances in which the same person logs in from multiple internet protocol (IP) addresses. For example, if the same person is trying to log in from an unusually high (e.g., hundreds) of different IP addresses, it may suggest that a malicious script is executing and should be investigated.

In some embodiments, a geographical location submodule 708 may detect the geographical location of activity associated with a network device. That is, the geographical location submodule 708 may analyze data indicative of the network device's physical location. For example, an administrator may have configured a device with a rule that it should remain at a company's physical headquarters. However, if the log(s) 702 indicate that the network device is at a location that is not the company's headquarters, it could indicate the device was stolen or at least that the activity should be investigated further.

In some embodiments, a network instability submodule 710 may detect and analyze data that indicates network instability. For example, the network instability submodule 710 may identify instances of port flapping, such as instances due to power fluctuations. As another example, the network instability submodule 710 may detect situations in which a packet is sent to a destination but returns to the same location. This may be indicative of a network loop that should be investigated further.

In some embodiments, an Address Resolution Protocol (ARP) submodule 712 may analyze the recorded data to detect ARP spoofing attacks. For example, if the ARP submodule 712 detects incoming ARP packets, it may suggest that an attack is occurring.

In some embodiments, a denial-of-service (DOS) submodule 714 may identify activity indicative of a DoS attack, a distributed DoS attack, or activity indicating a flood of ARP packets. This activity may eventually harm or disrupt the network device or other devices on a network and may warrant further investigation.

In some embodiments, a duplicate IP address submodule 716 may identify instances in which two or more devices are assigned the same IP address. This may cause one of or both of the devices to be disabled.

In some embodiments, a telemetry statistics submodule 718 gather telemetry statistics from the log(s) 702. Telemetry statistics may refer to characteristics of a network device connection. These may include, but are not limited to, any one or more of source IP address of a connection, destination IP address of a connection, destination port(s), source port(s), time of connection, duration of connection, features used by a network device, or the like.

Telemetry statistics may provide insight into network activity that administrators and security personnel can leverage to improve their products or services. Service providers may determine from the telemetry statics which features are popular amongst its customers. For example, if a service provider has hundreds of customers and a large majority of its customers use a 2.4 GHz frequency option over a 5 GHz frequency option, the service provider may be more inclined to devote more resources to developing and maintaining routers that provide the 2.4 GHz frequency.

As another example, telemetry statistics may inform service providers which features are most important or most used by customers. For an antivirus package, for example, the telemetry statistics may indicate that customers rarely use a file scanning feature of the antivirus package. Accordingly, the provider may be inclined to focus more effort on improving the file scanning feature for further deployments, or to instead devote resources to other features of the antivirus package.

Telemetry statistics may also indicate to providers how urgent a certain remedy or fix would be. For example, if a first product and a second product require attention, and the telemetry statistics indicate that the first product is considerably more popular than the second product, the provider may be more inclined to address the issue with the first product before addressing the issue with the second product.

The telemetry statistics may also inform providers of the most appropriate days and times to perform maintenance activities. For example, if the telemetry statistics indicate that there is little activity on Sunday mornings, providers may select this time to perform maintenance activities such as upgrades, backups, restorations, or the like.

The analytics facility 168 may include or otherwise execute any one or more of the various submodules 704-718. The submodules 704-718 and the associated analyses are presented by way of example only and other submodules and conducted analyses may be used in accordance with the various embodiments herein.

Based on the analyses, the analytics facility 168 may output alerts, metrics, or some combination thereof regarding the collected data. An administrator or other interested entity may review the cause of the alert or metric(s) associated with the recorded data. The remedial actions facility 128 may automatically or a user may then manually implement one or more mitigation measures based on, for example, an identified threat or an identified issue.

Figure 8:
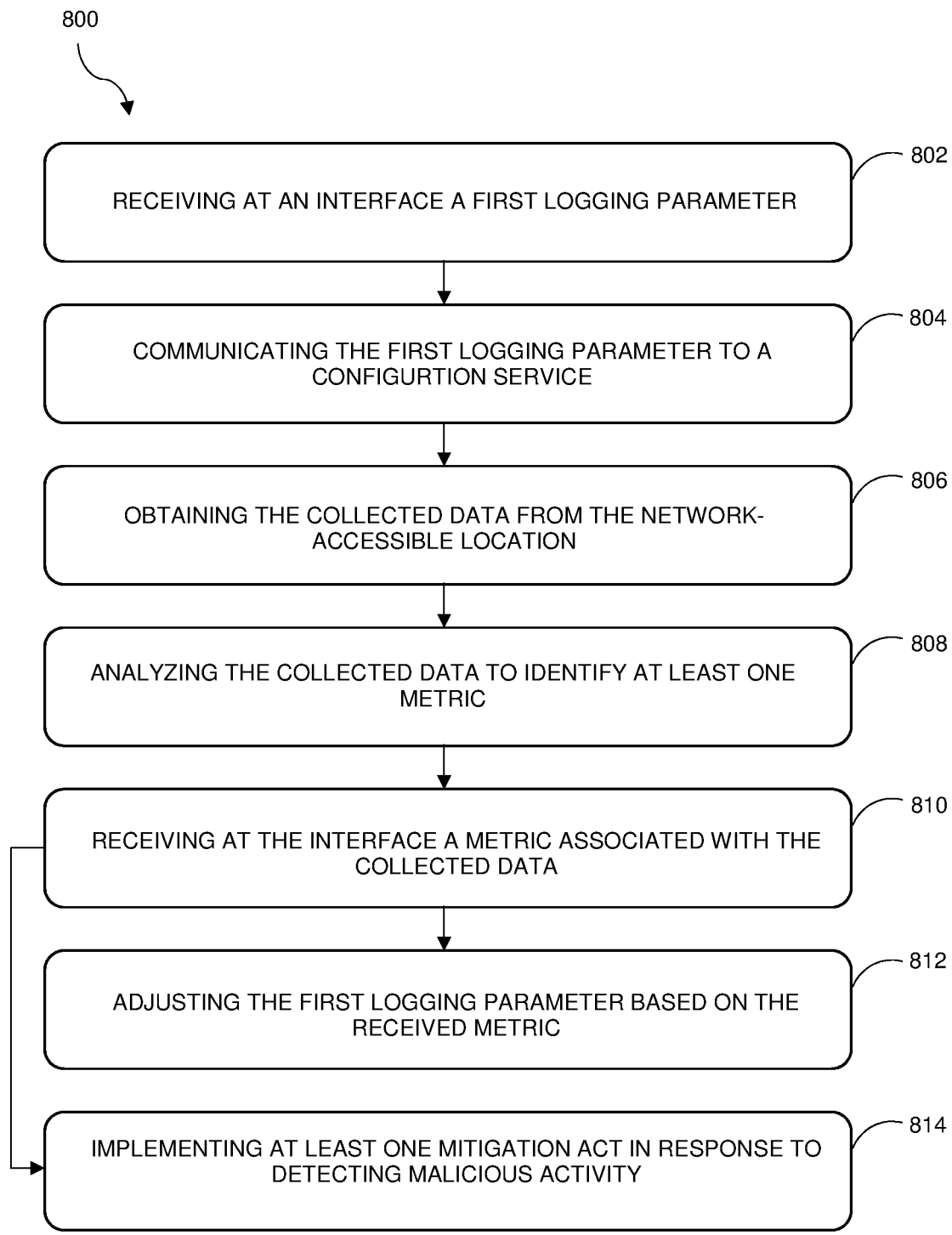
FIG. 8 depicts a flowchart of a method for monitoring network activity in accordance with one embodiment.

FIG. 8 depicts a flowchart of a method 800 of monitoring network activity in accordance with one embodiment. The method 800 may be implemented by one or more the devices, components, and/or services illustrated in FIGS. 1-7, and is discussed by way of reference thereto.

Step 802 involves receiving at an interface such as user interface 202 a first logging parameter for a first network device 12, wherein the first logging parameter specifies how the first network device 12 is to record data associated with the first network device 12. A user 204 such as an administrator may provide one or more logging parameters.

Step 804 involves communicating the first logging parameter to a configuration service 206. This step may involve communicating the first logging parameter to the configuration service 206 to generate a configuration file 400 for the network device 12. The generated configuration file may include or otherwise indicate a network-accessible location where the first network device is to transit its collected data.

The configuration service 206 may the transmit the configuration file to the first network device. The first network device may be configured to convert the configuration file to a second logging parameter, collect data in accord with the second logging parameter, and transmit the collected data to the network-accessible location.

Step 806 involves obtaining the collected data from the network-accessible location such as storage 28. For example, an administrator or security personnel may request access to and obtain the collected data from the storage 28.

Step 808 involves analyzing the collected data to identify at least one metric associated with the collected data. For example, the analytics facility 168 may execute one or more of the submodules 704-718 of FIG. 7 to analyze the collected log(s).

Step 810 involves receiving at the interface 202 a metric associated with the collected data. The metric(s) may relate to network activity associated with the network device 12, such as a feature used by the first network device 12. For example, and as discussed above in conjunction with FIG. 7, the analytics facility 168 may analyze various types of data associated with a network device such as the telemetry statistics.

Step 812 involves adjusting the first logging parameter based on the received metric. The analysis of the collected data may indicate that one or more logging parameters should be adjusted. For example, if the network device 12 is collecting an excessive amount of data and therefore generating an excessive amount of logs, the embodiments herein may autonomously throttle the logging activity of a network device 12 so that the network device 12 generates fewer logs.

Step 812 may further involve communicating the adjusted logging parameter to the first network device 12. A user may provide the adjusted logging parameter, or the remediation actions facility 128 herein may autonomously provide the adjusted logging parameter.

Step 814 involves implementing at least one mitigation act in response to detecting malicious activity. The collected data may indicate the presence of malicious activity or activity that should at least be investigated further. Accordingly, the remedial actions facility 128 may perform any one or more of the remedial or mitigation actions discussed previously.

Figure 9:
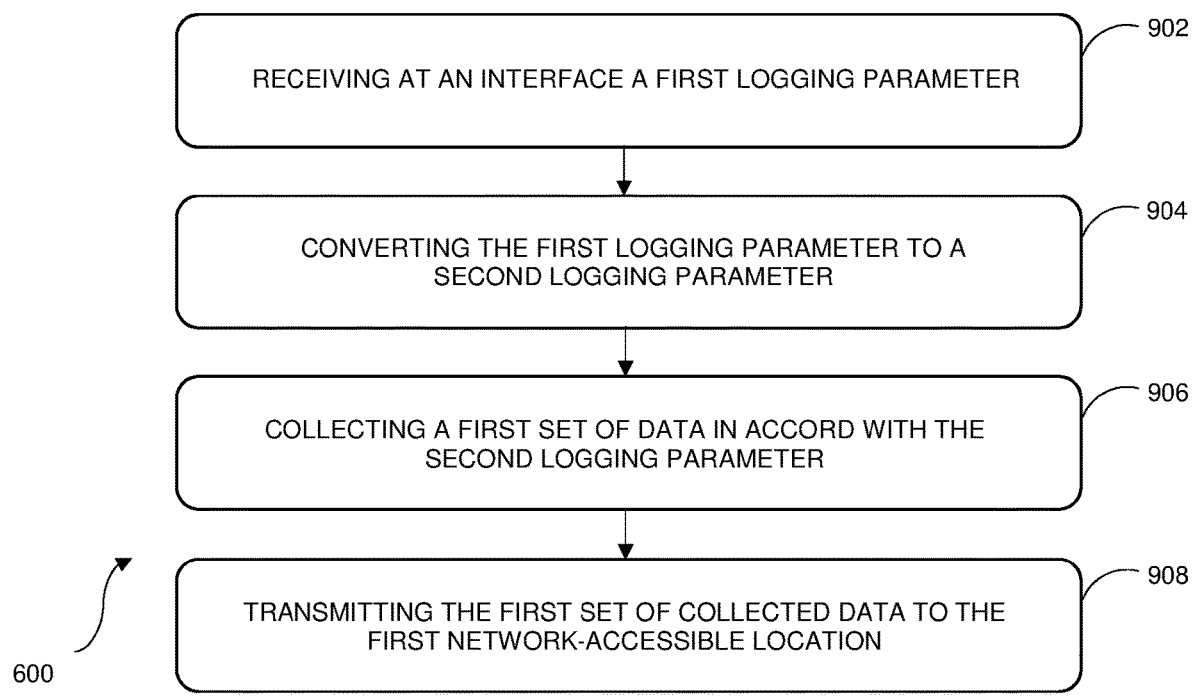
FIG. 9 depicts a flowchart of a method for monitoring network activity in accordance with another embodiment.

FIG. 9 depicts a flowchart of a method 900 of monitoring network activity in accordance with another embodiment. The method 900 may be implemented by one or more the devices, components, and/or services illustrated in FIGS. 1-7, and is discussed by way of reference thereto.

Step 902 involves receiving at an interface of a first network device 12 a first logging parameter from a configuration service 206. The first logging parameter may specify how the first network device 12 is to collect data associated with the first network device 12 and specifies a network-accessible location such as the storage 28 where the first network device 12 is to transmit the collected data.

Step 904 involves converting the first logging parameter to a second logging parameter for execution by the first network device 12. For example, the first logging parameter may be communicated as part of a configuration file such as a changelog. The first network device 12 may execute an agent 210 to call a library 212 to determine how to convert the configuration file to a second logging parameter to obtain the desired logging functionality.

Step 906 involves collecting a first set of data in accord with the second logging parameter. An agent 210 executing on the network device 12 may instruct or configure one or more software modules 208a—n to gather in accord with the provided logging parameter(s).

Step 910 involves transmitting the first set of collected data to the first network-accessible location. Once or after the first network device 12 collects the required data, the first network device 12 may transmit the collected data to the storage 28. The network device 12 may transmit the collected data at specified intervals, for example.

As discussed above, configuring devices to gather logs can be a difficult and error-prone process. Configuring a device to gather logs typically involves modifying a device's firmware. This can be a time-consuming and complex process, and likely leads to downtime of the device.

Retrieving and reviewing the desired logs can also be a complicated process. For example, obtaining the correct logs (e.g., the logs that are the most helpful in diagnosing an issue) may require multiple iterations. That is, security personnel or product support specialists tasked with reviewing logs, identifying issues, and remedying the same may not have direct access to gathered logs. Accordingly, they may ask a device administrator to provide a device's logs. However, there is no guarantee that the security personnel requests the correct logs or that the administrator provides the correct logs, or even that the device(s) collected the correct data.

The embodiments described herein provide technical advantages in the field of network activity monitoring that overcome the above disadvantages of existing techniques. First, the cloud-based interface allows an administrator to configure various logging parameters for an individual network device or a group of network devices. Accordingly, the administrator has greater control over how a network device collects data (e.g., which data the device collects, how often the device collects the desired data, etc.).

This control over the log collection process increases the likelihood that the desired logs are later available for analysis, and therefore obviates the need for the manual, iterative process of requesting and receiving various log files. This allows security personnel, administrators, or the remedial actions facility 128 of FIG. 1 to address issues more quickly than what is achievable with existing, manual-based log retrieval and analysis techniques.

Second, the cloud-based interface allows the administrator to configure the logging parameters at a location remote from the device. Accordingly, the administrator need not, for example, modify the firmware of the device to configure the device with the desired logging parameter(s). As discussed previously, modifying the device's configuration may require disruption to the device's functionality, such as leading to downtime. By avoiding firmware modification, the embodiments herein enable computing resources to continue operating as intended and without disruption.

Third, the embodiments herein transmit the collected data (i.e., logs) to a designated network-accessible location. Network devices typically have limited storage. It is therefore not practical or desirable for network devices to continuously gather and store logs locally. By transferring the collected data to a designated, network-accessible location, network devices in accordance with the embodiments herein preserver computing resources and storage space. This allows network devices to preserve computing resources and operate more efficiently than if they had to store logs locally.

Fourth, the embodiments herein gather various telemetry statistics related to one or more network devices and their associated activity. These telemetry statistics may provide insight as to, for example, features most prominently used by network devices, activity that is or is potentially malicious, dates or times associated with minimal network activity, or the like. This insight allows administrators, security personnel, or facilities of the threat management facility 100 to devote resources efficiently. For example, and as discussed above, the embodiments herein may leverage these statistics to know which features to focus on improvement, when to implement threat mitigation procedures, or when to perform updates or maintenance.

According to one aspect, embodiments relate to a method for monitoring network activity. The method includes receiving at an interface a first logging parameter for a first network device, wherein the first logging parameter specifies how the first network device is to collect data associated with the first network device; communicating the first logging parameter to a configuration service, wherein the configuration service generates a configuration file including a network-accessible location where the first network device is to transmit its collected data, and transmits the configuration file to the first network device, wherein the first network device is configured to convert the configuration file to a second logging parameter, collect data in accord with the second logging parameter, and transmit the collected data to the network-accessible location.

In some embodiments, the method further includes obtaining the collected data from the network-accessible location and analyzing the collected data to identify at least one metric associated with the collected data.

In some embodiments, the first logging parameter defines log files for the first network device to collect, log thresholds for one or more software modules associated with the first network device, or frequency for the first network device to collect log files.

In some embodiments, the method further includes communicating a signal to an agent executing on the first network device to begin collecting data.

In some embodiments, the method further includes receiving at the interface at least one metric associated with the collected data, wherein the at least one metric indicates a feature used by the first network device.

In some embodiments, the method further includes receiving at the interface a metric associated with the collected data, adjusting the first logging parameter based on the received metric, and communicating the adjusted logging parameter to the configuration service. In some embodiments, the adjusted logging parameter instructs the first network device to reduce an amount of data collected by the first network device.

In some embodiments, the configuration file is transmitted to the first network device without modifying firmware associated with the first network device.

In some embodiments, the method further includes analyzing the collected data for malicious activity and implementing at least one mitigation act in response to detecting malicious activity.

According to another aspect, embodiments relate to a method for monitoring network activity. The method includes receiving at an interface of a first network device a first logging parameter from a configuration service, wherein the first logging parameter specifies how the first network device is to collect data associated with the first network device and specifies a network-accessible location where the first network device is to transmit the collected data; converting the first logging parameter to a second logging parameter for execution by the first network device; collecting a first set of data in accord with the second logging parameter; and transmitting the first set of collected data to the first network-accessible location.

In some embodiments, the first logging parameter is received as a configuration file from the configuration service.

In some embodiments, the first logging parameter defines log files for the first network device to collect, log thresholds for one or more software modules associated with the first network device, or frequency for the first network device to collect log files.

In some embodiments, converting the first logging parameter to the second logging parameter includes executing an agent on the first network device to call a library to determine how to convert the first logging parameter to the second logging parameter.

In some embodiments, the method further includes transmitting to the network-accessible location a metric associated with the first set of collected data, wherein the metric indicates a feature used by the first network device.

In some embodiments, the method further includes receiving at the interface at least one adjusted logging parameter, converting the adjusted logging parameter to a converted adjusted logging parameter, and collecting data in accord with the converted adjusted logging parameter. In some embodiments, the adjusted logging parameter instructs the first network device to reduce an amount of data collected by the first network device.

In some embodiments, the first network device collects data in accord with the second logging parameter without modifying firmware associated with the first network device.

In some embodiments, the first logging parameter includes a first set of instructions for a first module executing on the first network device and includes a second set of instructions for a second module executing on the first network device.

According to another aspect, embodiments relate to a system for monitoring network activity. The system includes a first network device, an interface for at least receiving a first logging parameter for the first network device, wherein the first logging parameter specifies how the first network device is to collect data associated with the first network device; and a configuration service configured to receive the first logging parameter from the interface, generate a configuration file based on the first logging parameter, the generated configuration file including a network-accessible location where the first network device is to transmit its collected data, and transmit the configuration file to the first network device, wherein the first network device is configured to receive the configuration file from the configuration service, convert the configuration file to a second logging parameter, collect data in accord with the second logging parameter, and transmit the collected data to the network-accessible location.

In some embodiments, the first logging parameter defines log files for the first network device to collect, log thresholds for one or more software modules associated with the first network device, or frequency for the first network device to collect log files.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for monitoring network activity, the method comprising:
   receiving at an interface a first logging parameter for a first network device, wherein the first logging parameter specifies how the first network device is to collect data associated with the first network device;
   communicating the first logging parameter to a configuration service, wherein the configuration service:
   generates a configuration file including a network-accessible location where the first network device is to transmit its collected data, and transmits the configuration file to the first network device, wherein the first network device is configured to convert the configuration file to a second logging parameter, collect data in accord with the second logging parameter, and transmit the collected data to the network-accessible location.

2. The method of claim 1 further comprising:
obtaining the collected data from the network-accessible location, and
analyzing the collected data to identify at least one metric associated with the collected data.

3. The method of claim 1 wherein the first logging parameter defines log files for the first network device to collect, log thresholds for one or more software modules associated with the first network device, or frequency for the first network device to collect log files.

4. The method of claim 1 further comprising communicating a signal to an agent executing on the first network device to begin collecting data.

5. The method of claim 1 further comprising:
receiving at the interface at least one metric associated with the collected data, wherein the at least one metric indicates a feature used by the first network device.

6. The method of claim 1 further comprising:
receiving at the interface a metric associated with the collected data;
adjusting the first logging parameter based on the received metric; and
communicating the adjusted logging parameter to the configuration service.

7. The method of claim 6 wherein the adjusted logging parameter instructs the first network device to reduce an amount of data collected by the first network device.

8. The method of claim 1 wherein the configuration file is transmitted to the first network device without modifying firmware associated with the first network device.

9. The method of claim 1 further comprising:
analyzing the collected data for malicious activity, and
implementing at least one mitigation act in response to detecting malicious activity.

10. A method for monitoring network activity, the method comprising:
receiving at an interface of a first network device a first logging parameter from a configuration service, wherein the first logging parameter specifies how the first network device is to collect data associated with the first network device and specifies a network-accessible location where the first network device is to transmit the collected data;
converting the first logging parameter to a second logging parameter for execution by the first network device;
collecting a first set of data in accord with the second logging parameter; and
transmitting the first set of collected data to the first network-accessible location.

11. The method of claim 1 wherein the first logging parameter is received as a configuration file from the configuration service.

12. The method of claim 1 wherein the first logging parameter defines log files for the first network device to collect, log thresholds for one or more software modules associated with the first network device, or frequency for the first network device to collect log files.

13. The method of claim 1 wherein converting the first logging parameter to the second logging parameter includes executing an agent on the first network device to call a library to determine how to convert the first logging parameter to the second logging parameter.

14. The method of claim 1 further comprising transmitting to the network-accessible location a metric associated with the first set of collected data, wherein the metric indicates a feature used by the first network device.

15. The method of claim 1 further comprising:
receiving at the interface at least one adjusted logging parameter;
converting the adjusted logging parameter to a converted adjusted logging parameter; and
collecting data in accord with the converted adjusted logging parameter.

16. The method of claim 15 wherein the adjusted logging parameter instructs the first network device to reduce an amount of data collected by the first network device.

17. The method of claim 1 wherein the first network device collects data in accord with the second logging parameter without modifying firmware associated with the first network device.

18. The method of claim 1 wherein the first logging parameter includes a first set of instructions for a first module executing on the first network device and includes a second set of instructions for a second module executing on the first network device.

19. A system for monitoring network activity, the system comprising:
a first network device;
an interface for at least receiving a first logging parameter for the first network device, wherein the first logging parameter specifies how the first network device is to collect data associated with the first network device;
a configuration service configured to:
receive the first logging parameter from the interface,
generate a configuration file based on the first logging parameter, the generated configuration file including a network-accessible location where the first network device is to transmit its collected data, and
transmit the configuration file to the first network device,
wherein the first network device is configured to:
receive the configuration file from the configuration service,
convert the configuration file to a second logging parameter,
collect data in accord with the second logging parameter, and
transmit the collected data to the network-accessible location.

20. The system of claim 19 wherein the first logging parameter defines log files for the first network device to collect, log thresholds for one or more software modules associated with the first network device, or frequency for the first network device to collect log files.

* * * * *